United States Patent [19]

Kageyama et al.

[11] Patent Number: 5,621,564

[45] Date of Patent: Apr. 15, 1997

[54] SEMICONDUCTOR OPTICAL MODULATOR

[75] Inventors: Shigeki Kageyama; Katsuhiko Goto; Toru Takiguchi, all of Itami, Japan

[73] Assignee: Mitsubishi Denki Kabushiki Kaisha, Tokyo, Japan

[21] Appl. No.: 314,423

[22] Filed: Sep. 28, 1994

[30] Foreign Application Priority Data

Oct. 5, 1993 [JP] Japan ................................ 5-248922

[51] Int. Cl.$^6$ ............................................ G02F 1/03
[52] U.S. Cl. ............................................ 359/248
[58] Field of Search ................................ 359/248

[56] References Cited

U.S. PATENT DOCUMENTS

| 5,315,430 | 5/1994 | Brennan et al. | 359/248 |
| 5,373,166 | 12/1994 | Buchan et al. | 257/18 |

FOREIGN PATENT DOCUMENTS

| 378098 | 1/1990 | European Pat. Off. . |
| 420749 | 9/1990 | European Pat. Off. . |
| 488820 | 11/1991 | European Pat. Off. . |
| 558089 | 2/1993 | European Pat. Off. . |
| 9214174 | 1/1992 | WIPO . |

*Primary Examiner*—Georgia Y. Epps
*Assistant Examiner*—Thomas Robbins
*Attorney, Agent, or Firm*—Leydig, Voit & Mayer

[57] ABSTRACT

A semiconductor optical modulator includes an active region including a multi quantum well structure. Thereby, it is possible to absorb laser light having two polarization wave modes to a high degree as well as increase the number of quantum wells without fracturing the crystal, thereby providing a modulator having no polarization plane dependency and an increased extinction ratio. Further, a plurality of electrodes, each having an aperture, are provided at an upper surface and an electrode having the same number of apertures as on the upper surface is provided at a lower surface opposite the other electrodes. Multiple laser light beams incident from the apertures at the upper surface are respectively modulated and output from the apertures at the opposing lower surface. Therefore, in the active region, laser light beams including both TE and TM modes are absorbed or transmitted by the modulator without dependency on their respective polarization planes.

13 Claims, 10 Drawing Sheets

SEMICONDUCTOR OPTICAL MODULATOR

FIELD OF THE INVENTION

The present invention relates to a compound semiconductor optical modulator and, more particularly, to a semiconductor optical modulator for modulating light not depending on the plane of polarization of incident light.

BACKGROUND OF THE INVENTION

Figure 9A:
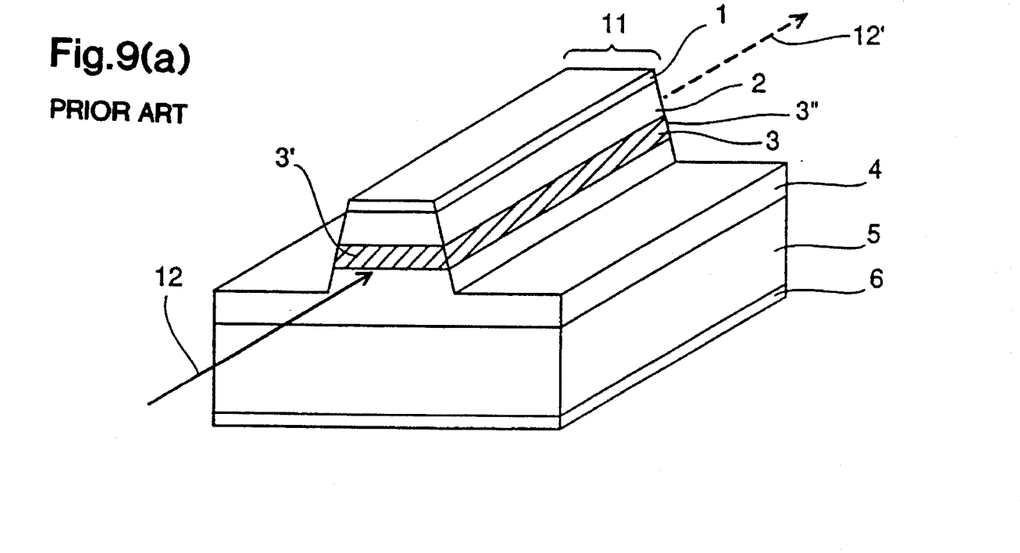
FIG. 9(a) is a perspective view illustrating a prior art semiconductor optical modulator and, FIG. 9(b) is a partially enlarged view illustrating a laminated structure of an active region thereof.

FIG. 9(a), for example, is a perspective view illustrating a schematic construction of a conventional semiconductor optical modulator described in fifty-third Applied Physics Society, Scientific Lecture Meeting Proceedings 16a-x-1 (p. 911) 1992 autumn. In the figure, reference numeral 1 designates a p side electrode, reference numeral 2 designates a p type InP cladding layer, reference numeral 4 designates an n type InP cladding layer, reference numeral 5 designates an n type InP substrate, reference numeral 6 designates an n side electrode, reference numeral 3 designates an active region of a multi quantum well structure formed on a ridge portion 11, and reference numeral 12 designates a CW (continuous wave) laser light incident on the active region 3, having a wavelength of 1.585 μm. Reference numeral 12' designates modulated light irradiated from the active region 3.

Figure 9B:
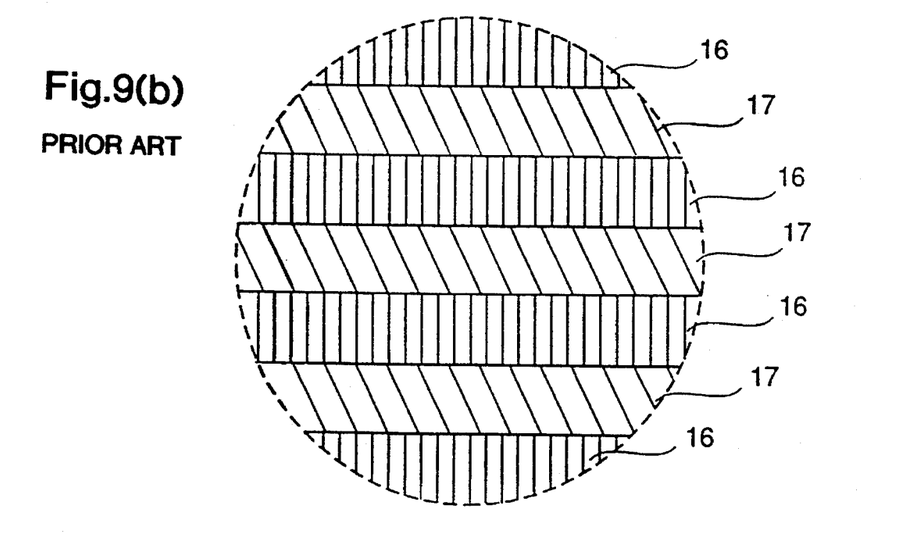
Figure 10:
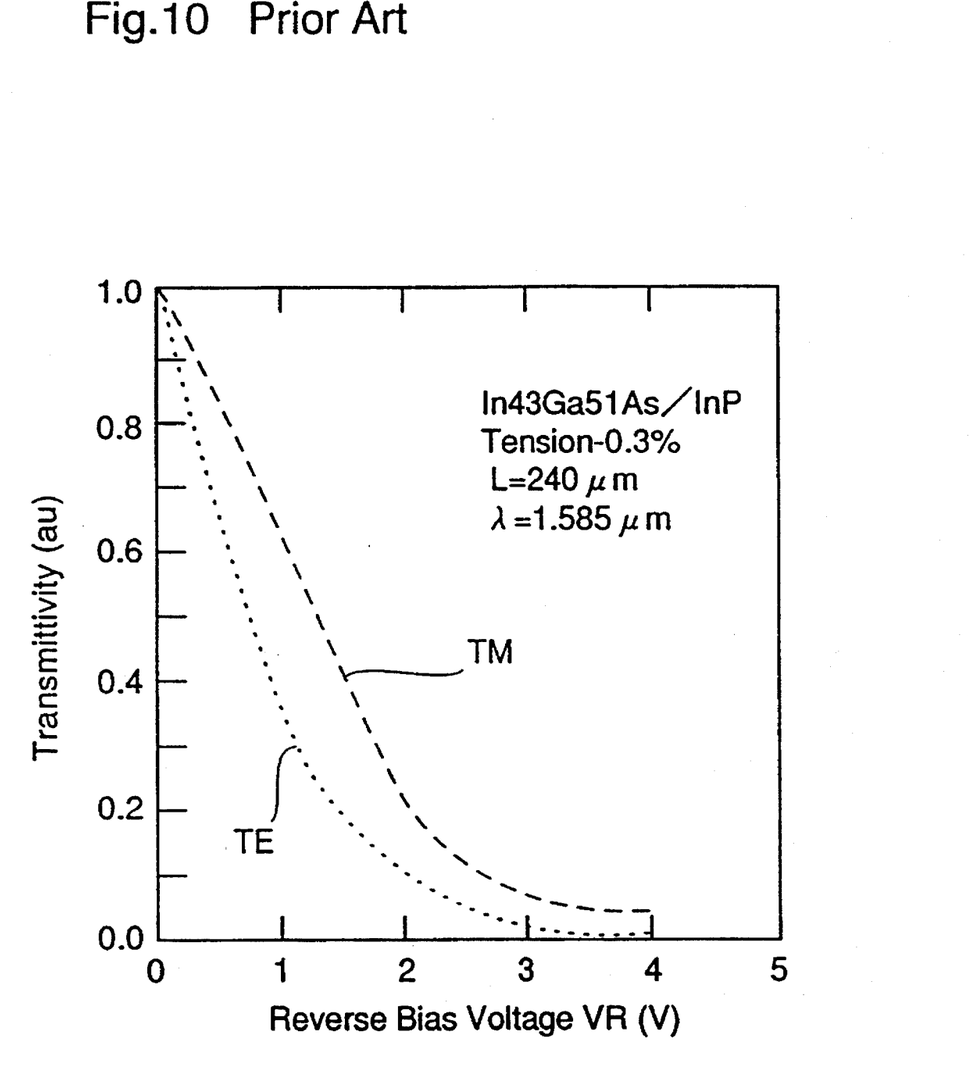
FIG. 10 is a graph illustrating a reverse bias dependency of transmission in a prior art semiconductor optical modulator with an active region in which a lattice strain of −0.3% is introduced.

FIG. 9(b) is a partially enlarged view illustrating a layer structure of the active region 3. In the figure, reference numeral 16 designates an InP barrier layer 11 nm thick, reference numeral 17 designates an $In_{0.49}Ga_{0.51}As$ well layer having a lattice strain of −0.3%, and 11.5 nm thick. The active region 3 comprises 20 periods of a repetition of $In_{0.49}Ga_{0.51}As$ well layer 17 and InP barrier layer 16, forming a multi quantum well structure including tensile stress.

A description is given of the operation.

When a laser light 12 is incident on the front surface 3' of the active region 3 in the ridge portion 11 as shown in FIG. 9(a), and when no electric field is applied to the active region 10, the laser light 12 is transmitted in a waveguide comprising the active region 10 and is emitted from the rear facet 3".

When a negative voltage is applied to the p side electrode 1 and a positive voltage is applied to the n side electrode 6, and this reverse bias voltage forms an electric field applied to the active region 3, the active region 3 operating as a waveguide functions as an absorption layer due to the quantum confining Stark effect and absorbs the laser light 12 and the advance of the laser light 12 is cut off.

The laser light 12 incident on the active region 3 has a plane of polarization as an electromagnetic wave. In a case where the light source emitting the laser light 12 is a white light laser, the laser light 12 has two polarization planes, TE mode and TM mode. In a semiconductor optical modulator having a general structure, since the light is absorbed mainly in either TE mode or TM mode, even when an electric field is applied to the active region to make it function as an absorption layer, the light of the other mode might be transmitted. In a structure in which the laser light 12 advances in parallel to the junction plane of the active region as shown in FIG. 9(a), the light of TE mode is mainly absorbed, and the light of TM mode is transmitted without being absorbed even if the reverse bias voltage is increased to intensify the electric field, whereby the transmitted light of TM mode reaches the light receiving element, thereby producing an erroneous operation of the light receiving element.

The active region 3 of the semiconductor optical modulator shown in FIG. 9(a), is shown in FIG. 9(b) in an enlarged view, and comprises 20 periods of a repetition of $In_{0.49}Ga_{0.51}As$ well layer 17 having a lattice strain of −0.3% and InP barrier layer 16, forming a multi quantum well structure. In this way, by introducing a tensile strain of 0.3% into the active region 3, incident laser light 12 can be absorbed without dependency on the plane of polarization.

Since the electric field dependency of transmissivity in the active region 3 including a tensile stress of 0.3% is as shown in FIG. 8, when a reverse bias voltage above 3 V is applied between p side electrode 1 and n side electrode 6 of the semiconductor optical modulator having the active region 3, the absorption in the TE mode and the absorption in the TM mode of the laser light 12 of a wavelength 1.585 μm are approximately equal to each other, thereby reducing the dependency on the plane of polarization.

The absorption/transmission operation is repeated at a high speed in accordance with on/off state of the reverse bias voltage of above 3 V of a modulation signal applied between the p side electrode 1 and the n side electrode 6, whereby the Cw laser light 12 is emitted as a pulsed modulated light 12' in accordance with the modulation signal from the rear face 3" of the active region 3.

The prior art semiconductor optical modulator is constituted as described above, and the polarization plane dependency can be reduced to some extent, but the absorption coefficients of both TM and TE modes cannot be increased unless a reverse bias voltage above 3 V is applied. Further, when the number of repetitions forming the multi quantum well is further increased from 20 periods of a repetition of $In_{0.49}Ga_{0.51}As$ well layer 17 and InP barrier layer 16 to increase the light extinction ratio, the negative lattice strain also increases at the same time, and the crystal would be fractured by the stress due to the increased strain. Further, it is impossible to make a two dimensional array which modulates a plurality of incident light beam and outputs a plurality of modulated light beam as a semiconductor optical modulator.

SUMMARY OF THE INVENTION

It is an object of the present invention to provide a semiconductor optical modulator that can produce a high light extinction ratio in both TM and TE modes, driven with a low reverse bias voltage, and further that would not cause fracture of a crystal even when the light extinction ratio is increased due to the active region being of a multi layer structure.

It is another object of the present invention to provide a semiconductor optical modulator in a two dimensional array that has such characteristic.

Other objects and advantages of the present invention will become apparent from the detailed description given hereinafter; it should be understood, however, that the detailed description and specific embodiment are given by way of illustration only, since various changes and modifications within the scope of the invention will become apparent to those skilled in the art from this detailed description.

According to a first aspect of the present invention, a semiconductor optical modulator including an active region having a first semiconductor layer comprising a material having a lattice constant larger than that of a semiconductor substrate and a second semiconductor layer of a material having a lattice constant smaller than that of the semiconductor substrate on the semiconductor substrate. When a laser light incident on the active region is absorbed, among two polarization modes included in the laser beam, the first semiconductor layer absorbs the light of one of the polarization modes, while the second semiconductor layer absorbs the light of the other of the polarization modes. Therefore, it is possible to absorb the laser light having two polarization modes at high gain, thereby performing a modulation having no polarization plane dependency.

According to a second aspect of the present invention, the active region comprises a multi quantum well structure comprising a first quantum well layer having a positive lattice strain, a second quantum well layer having a negative lattice strain, a barrier layer, and cladding layers having an energy band gap larger than those of the first quantum well layer, the second quantum well layer, and the barrier layer, disposed at above and below the active region. Therefore, when an electric field is applied to the active region, of two polarization modes of the laser light incident to the active region, the first quantum well layer absorbs the light of one of the polarization modes, while the second quantum well layer absorbs the light of the other of the polarization modes. When no electric field is applied, the incident laser light transmits the active region and is output without the intensity of the laser light being lowered. Because the positive strain of the first quantum well layer and the negative strain of the second quantum well layer cancel with each other, the total strain quantity of the active region is suppressed. Thereby, it is possible to absorb the laser light having two polarization modes at a high gain, and to increase the number of quantum wells without causing fracture of the crystal, thereby performing a high efficiency modulation having no polarization plane dependency and an increased light extinction ratio.

According to a third aspect of the present invention, electrodes having apertures which have predetermined configurations and are opposite to each other are provided at the upper surface and the lower surface of the semiconductor optical modulator, and the laser light incident at the aperture at the upper surface or the lower surface is modulated and output from the apertures at the opposing lower surface or upper surface, respectively. Therefore, when a reverse bias voltage is applied between electrodes at the upper surface and lower surface, among the laser light including both TE and TM modes incident from the apertures at the upper surface or lower surface, the first quantum well layer absorbs the TM polarized wave and the second quantum well layer absorbs the TE polarized wave in the active region. When no reverse bias voltage is applied, the incident laser light is transmitted through the active region. Thus, absorption and transmission of the laser light of both of TE and TM modes can be performed, thereby enabling modulation of light including no polarization plane dependency from the apertures of the upper surface or lower surface.

According to a fourth aspect of the present invention, a plurality of electrodes each having an aperture are provided at the upper surface of the semiconductor optical modulator and an electrode having apertures which are provided in the same number as the apertures at the upper surface and which correspond to those at the upper surface is provided, whereby the plurality of laser light beams incident from the plurality of apertures at the upper surface or lower surface are respectively modulated and the plurality of modulated light beams are emitted from the plurality of apertures at the opposing lower surface or upper surface. Therefore, the plurality of laser light beams including both of TE and TM modes incident from the plurality of apertures at the upper surface or lower surface are absorbed or transmitted without dependency on their polarization planes in the active region, whereby a plurality of modulated lights respectively modulated without polarization plane dependency can be emitted.

DETAILED DESCRIPTION OF THE PREFERRED EMBODIMENTS

Embodiment 1

Figure 1A:
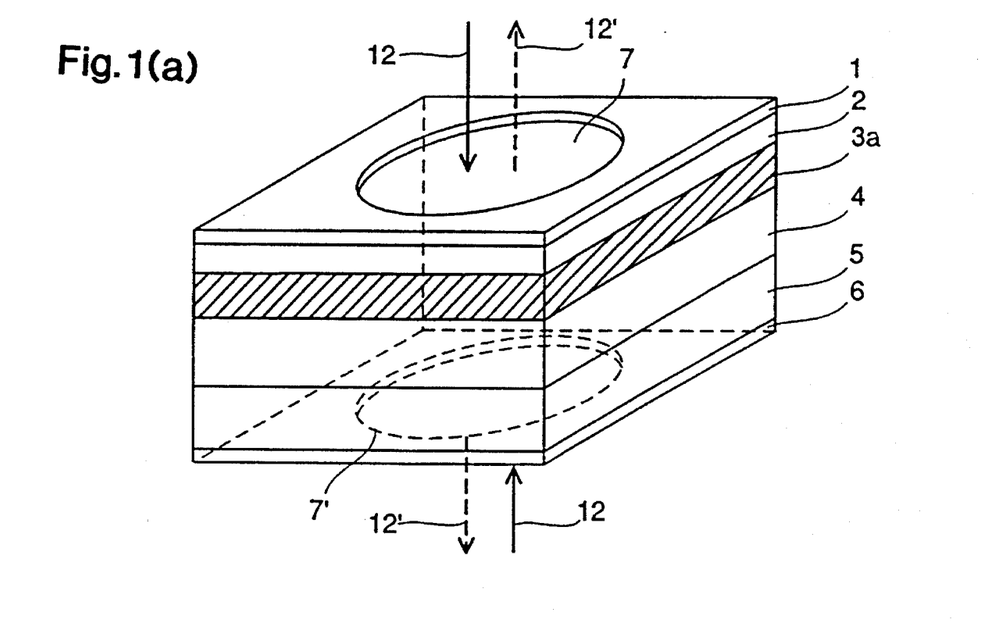
FIG. 1(a) is a perspective view illustrating a semiconductor optical modulator according to a first embodiment of the present invention and, FIG. 1(b) is a partially enlarged view illustrating a laminated structure of an active region thereof.

FIG. 1(a) is a perspective view illustrating a structure of a semiconductor optical modulator according to a first embodiment of the present invention. The semiconductor optical modulator shown in this figure has a size of 300 μm×300 μm square. This semiconductor optical modulator is produced by successively forming an n type InP substrate 5 500 μm thick, an n type InP cladding layer 4 1.5 μm thick, an active region 3a comprising a multi quantum well structure about 8 μm thick, a p type InP cladding layer 2 1.5 μm thick, and a p side electrode 1 comprising Au or Zn on the upper surface of the p type InP cladding layer 2, and an n side electrode 6 comprising Au or Cr on the lower surface of the n type InP substrate 5, and thereafter forming circular shaped apertures 7 and 7' of about 30 μm diameter at the p side electrode 1 and the n side electrode 6, respectively, by selective etching. The aperture 7 at the p side electrode 1 has a depth reaching the p type InP cladding layer 2 and the aperture 7' at the n side electrode 6 has a depth reaching the n type InP substrate 5. The light 12 of the CW laser of a wavelength 1.32 μm incident on one of the apertures is modulated in the active region 3a so that the modulated light 12' is emitted from the other side aperture.

Figure 1B:
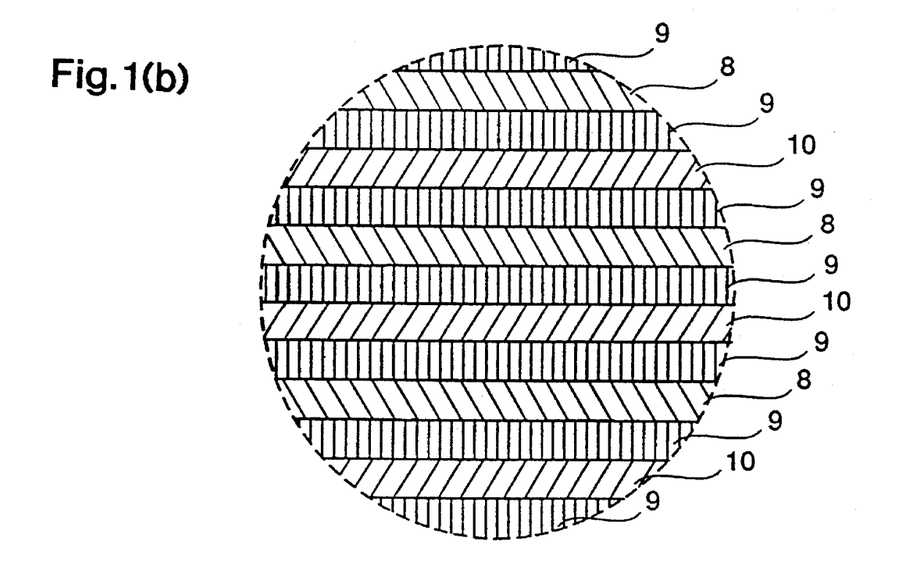

FIG. 1(b) is a partially enlarged view illustrating a layer structure of the active region 3a. In the FIG., reference numeral 8 designates an $In_{0.57}Ga_{0.43}As_{0.89}P_{0.11}$ compressive stress quantum well layer including a positive lattice strain (strain amount=+0.1%). Reference numeral 9 designates an $In_{0.77}Ga_{0.23}As_{0.51}P_{0.49}$ barrier layer having an energy band gap corresponding to a wavelength 1.15 μm. Reference numeral 10 designates an $In_{0.39}Ga_{0.61}As_{0.18}P_{0.82}$ tensile stress quantum well layer including a negative lattice strain (strain amount=−0.1%). The thicknesses of the respective layers are all 200 Å. The active region 3a has a total layer thickness of about 8 μm comprising 100 periods of laminated patterns each comprising, successively, a barrier layer 9, a compressive stress quantum well layer 8, a barrier layer 9, and a tensile stress quantum well layer 10.

A description is given of the operation.

In the semiconductor optical modulator having the structure as shown in FIG. 1(a), the laser light 12 which is output from the laser source irradiates to the aperture 7 from the upper surface to the lower surface, or the aperture 7' from the lower surface to the upper surface of the semiconductor optical modulator. The modulation operation is the same in any case where the laser light 12 is irradiated from any direction, so a description is given of only the modulation operation in a case where the laser light 12 irradiates the aperture 7' (lower surface) at the n side electrode 6 to the aperture 7 (upper surface) at the p side electrode 1.

First of all, the laser light 12 of a wavelength 1.32 μm incident from the aperture 7' at the n side electrode 6 is transmitted through the n type InP substrate 5 and the n type InP cladding layer 4 having energy band gaps corresponding to wavelengths longer than the laser light 12, and reaches the active region 3a.

When no voltage is applied between the p side electrode 1 and the n side electrode 6, the laser light 12 is transmitted to the active region 3a, and after the laser light 12 is transmitted through the active region 3a and passes through the p type InP cladding layer 2, the laser light is emitted from the aperture 7 provided at the p side electrode 1.

On the other hand, when a predetermined reverse bias voltage is applied between the p side electrode 1 and the n side electrode 6, the active region 3a of the multi quantum well structure functions as an absorption layer for the laser light 12 because of the Stark effect, and the advance of the laser light 12 incident from the aperture 7' at the n side electrode 6 is cut off.

Figure 2:
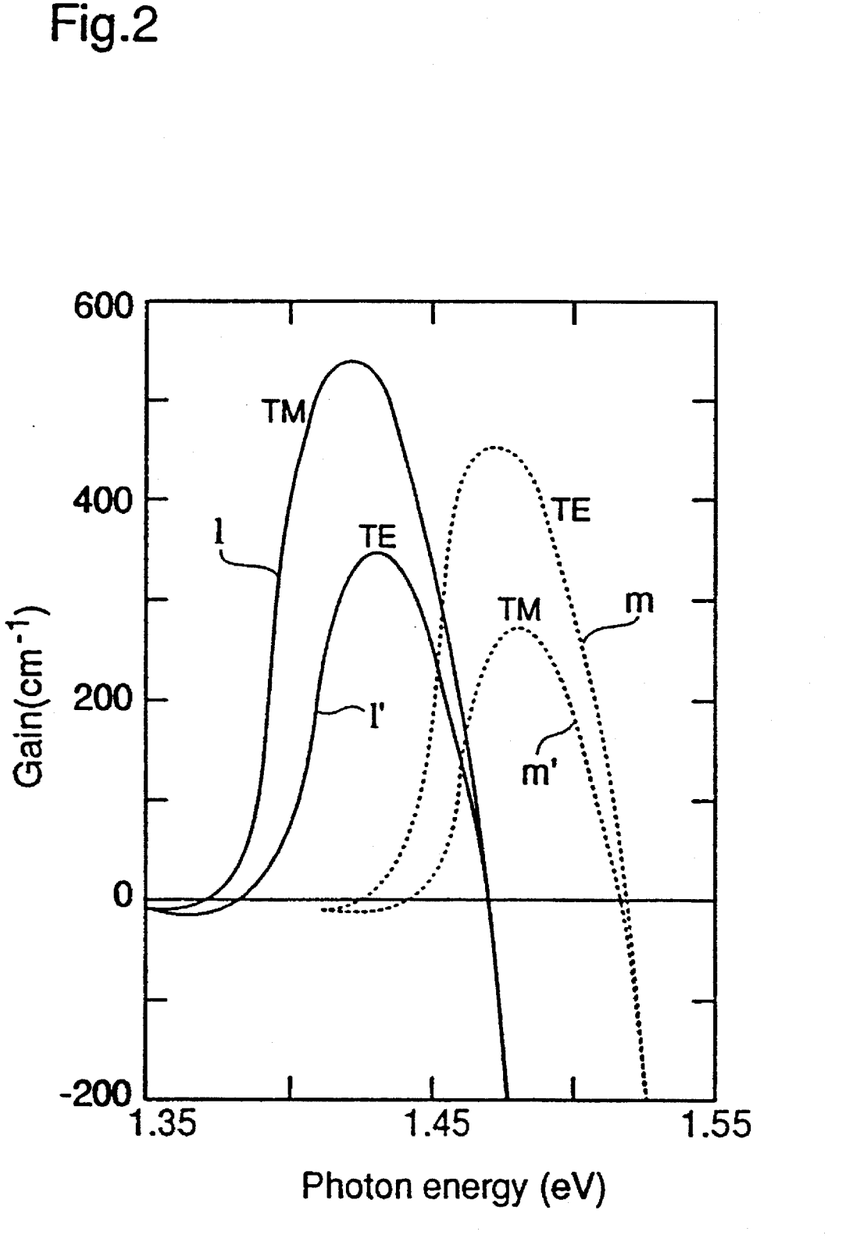
FIG. 2 is a diagram illustrating relations between the polarization mode and an absorption coefficient when a positive or a negative lattice strain is introduced.

Reference is made to IEEE JOURNAL OF QUANTUM ELECTRONICS. VOL. 25 NO. 2 FEBRUARY 1989 P.171~P.178 on the relation of the lattice strain and the polarization plane dependency. In this reference, as relations between the TE and TM polarized waves having positive or negative lattice strain and the absorption ratio, the gain for the light of TM mode is increased as indicated by 1 (TM mode) and 1' (TE mode) shown in solid lines in the quantum well having a negative strain while the gain for the light of TE mode is increased as indicated by m (TE mode) and m' (TM mode) in broken lines in the quantum well having a positive strain, as shown in FIG. 2. However, this relation is that in a semiconductor optical modulator having a structure for modulating the laser light advancing parallel to the junction surface of the active region 3 as shown in FIG. 9. In a structure which modulates the laser light 12 advancing perpendicular to the junction surface of the active region 3a as in the semiconductor optical modulator of this first embodiment, the above described relation is the reverse, presenting a high gain for the light of TE mode in the quantum well having a negative strain and a high gain for the light of TM mode in the quantum well having a positive strain.

Figure 3A:
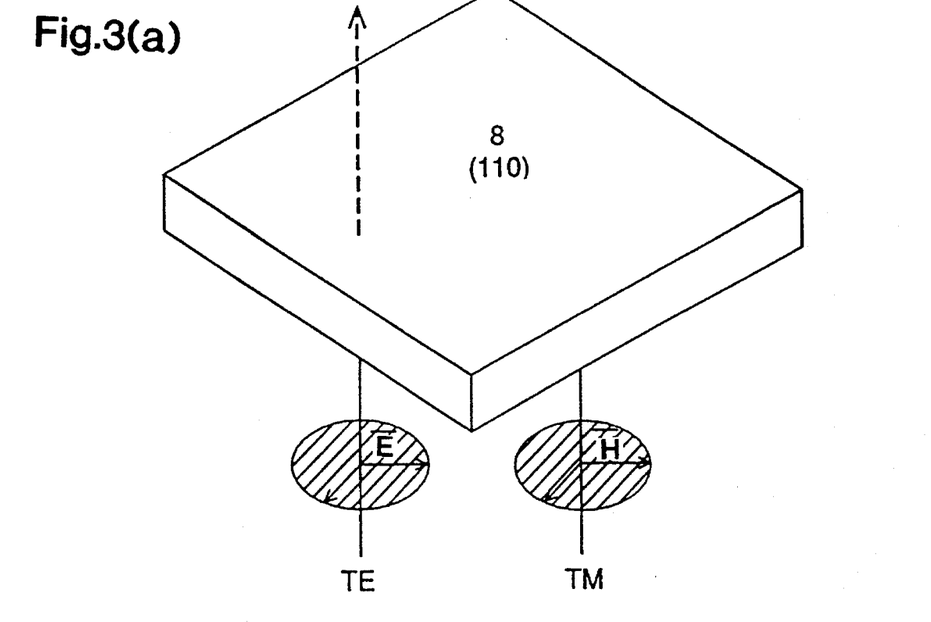
FIGS. 3(a) and 3(b) are diagrams illustrating relations between a positive or a negative lattice strain layer formed on the (110) surface and TE or TM polarized wave absorption.
Figure 3B:
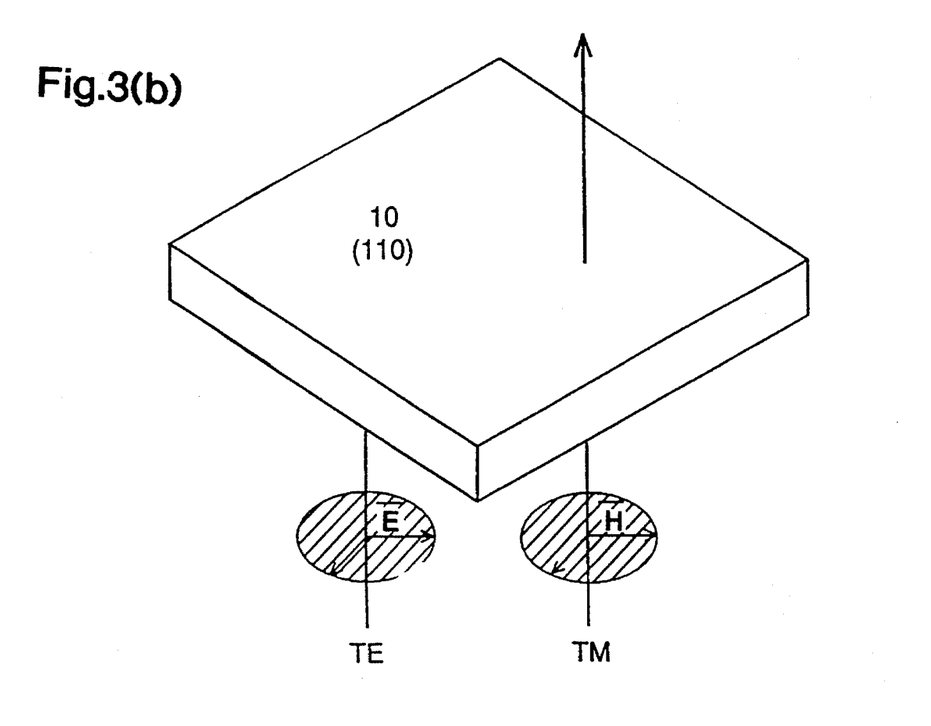

In other words, the active region 3a comprising a laminated layer structure as shown in FIG. 1(b) has two kinds of quantum well layers. The compressive stress quantum well layer 8 having a positive strain mainly absorbs the light of TM mode as shown in FIG. 3(a), and the tensile stress quantum well layer 10 having a negative strain mainly absorbs the light of TE mode as shown in FIG. 3(b). By the respective functions of the two kinds of quantum well layers 8 and 10 having a positive or a negative lattice strain, the light of TE mode and TM mode included in the laser light 12 are absorbed to a high degree.

The active region 3a has alternatingly laminated the compressive stress quantum well layer 8 and the tensile stress quantum well layer 10, and the total sum of strains becomes 0 since the positive lattice strain possessed by the compressive stress quantum well layer 8 and the negative lattice strain possessed by the tensile stress quantum well layer 10 cancel with each other. Thus, a net zero strain structure in which the crystal is not broken even when any number of layers are laminated is provided, and a desired number of periods may be laminated. In this case, one hundred periods of alternatingly laminated quantum well layers 8 and 10 are provided, whereby the forfeiture light ratio is increased. While a reverse bias voltage of above 3 V is required to reduce the polarization plane dependency in the prior art semiconductor optical modulator, the semiconductor optical modulator according to this first embodiment can obtain a high light extinction ratio at both of TE and TM modes, even driven with a further low reverse bias voltage.

The active region 3a absorbs both of the TE and TM modes to a high degree as described above and thereby increases the light extinction ratio repeats transmission of the laser light 12 of a continuous wave incident from the aperture part 7' at the n side electrode 6. Absorption independent of the polarization plane at a high speed in accordance with the turning off/on of the reverse bias voltage by a modulation signal applied between the p side electrode 1 and the n side electrode 6, is achieved. The modulated light 12' obtained by pulsing the laser light 12 in accordance with the modulation signal at a high forfeiture light ratio is emitted from the aperture 7 at the p side electrode 1.

In order not to reduce the light intensity of the emitted light (modulated light) 12' relative to the incident light (laser light) 12 of the semiconductor optical modulator, the energy band gaps of the p type InP cladding layer 2 and the n type InP cladding layer 4 have to be made larger or equal to the energy band gap of any of the laminated layers in the active region 3a, and apertures 7 and 7' are respectively provided at the p side electrode 1 and the n side electrode 6. However, if the p side electrode 1 and the n side electrode 6 are formed employing a material which does not absorb or reflect the laser light 12 of a wavelength 1.32 μm, the apertures 7 and 7' are not necessarily required.

Japanese Published Patent Application No. 61-184516 discloses an optical modulator that provides a high light extinction ratio with a small driving voltage in which layers each comprising a first semiconductor and layers each comprising a second semiconductor having a conduction band edge lower than the conduction band edge of the first semiconductor and an a valence band edge lower than the valence band edge of the first semiconductor are alternatingly laminated to form a semiconductor multi layer structure. The optical modulator of this publication, however, does not introduce positive and a negative lattice strains into the active region of a multi quantum well structure as in the semiconductor optical modulator of the first embodiment. This optical modulator unfavorably includes polarization plane dependency in the absorption of the laser light including both TE and TM modes as white laser light.

Japanese Published Patent Application No. Hei. 2-115818 discloses an optical modulator of a multi layer structure with repeatedly and alternatingly laminated a first semiconductor layer and a second semiconductor layer with a prescribed repetition period and including a barrier layer at each period. However, this optical modulator has an essence in that the first semiconductor layer monotonically changes its energy band gap in the laminated layer direction, and the second semiconductor layer has an energy band gap smaller than that of the first semiconductor layer and is provided in contact with a region of the first semiconductor layer having the maximum energy band gap, thereby providing a high light extinction ratio at a further low driving voltage. This publication, however, does not disclose an optical modulator with alternatingly laminated a quantum well layer 8 having a positive lattice strain and a quantum well layer 10 having a negative lattice strain both of which are located between barrier layers 9, thereby to provide a multi layer suppressing the total strain quantity and increasing the light extinction ratio. Thus, the optical modulator of this publication also provides a polarization plane dependency.

The above-described semiconductor optical modulator of this first embodiment includes, an active region 3a of a multi quantum well structure with alternatingly laminated a compressive stress quantum well layer 8 of +0.1% and a tensile stress quantum well layer 10 of −0.1%, any of the adjacent layers being located between barrier layer 9, whereby the polarization plane dependency for the laser light 12 including both of TE mode and TM mode is eliminated by the positive and negative lattice strains introduced into the active region 3a. Further, the compressive stress quantum well layer 8 and the tensile stress quantum well layer 10 cancel the strain quantities with each other, to suppress the total strain quantity of the active region 3a. Therefore, the quantum wells can be increased without fracturing the crystal, and a high light extinction ratio can be obtained for both of the TE and TM modes, even driven with a low reverse bias voltage.

Embodiment 2

Figure 4A:
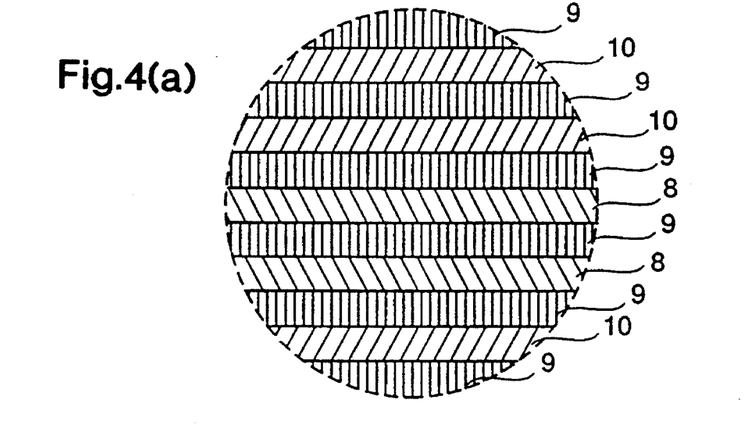
FIGS. 4(a)–4(c) are partially enlarged views illustrating laminated structures of active regions of a semiconductor optical modulator according to a second embodiment of the present invention.

In the first embodiment, the multi quantum well structure of the active region 3a comprises, alternatingly laminated the $In_{0.57}Ga_{0.43}As_{0.89}P_{0.11}$ compressive stress quantum well layer 8 and the $In_{0.39}Ga_{0.61}As_{0.18}P_{0.82}$ tensile stress quantum well layer 10 both of which are located between the $In_{0.77}Ga_{0.23}As_{0.51}P_{0.49}$ barrier layers 9. The semiconductor optical modulator of this second embodiment includes an active region 3a comprising a multi quantum well structure successively laminating two compressive stress quantum well layers 8 and two tensile stress quantum well layers 10, each of the layers being located between the barrier layers 9, and repeated in fifty periods.

In the semiconductor optical modulator provided with the active region 3a having the laminating layer pattern with such a periodicity, the compressive stress quantum well layer 8 absorbs the TM polarized wave and the tensile stress quantum well layer 10 absorbs the TE polarized wave, respectively, for the laser light 12 including both of the TE and TM modes, whereby the light having both of the TE and TM modes of the laser light 12 is absorbed with a high gain when an electric field is applied.

Figure 4B:
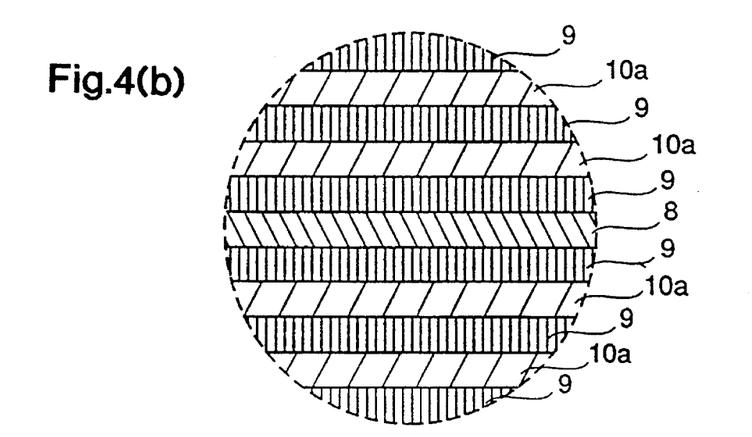
Figure 4C:
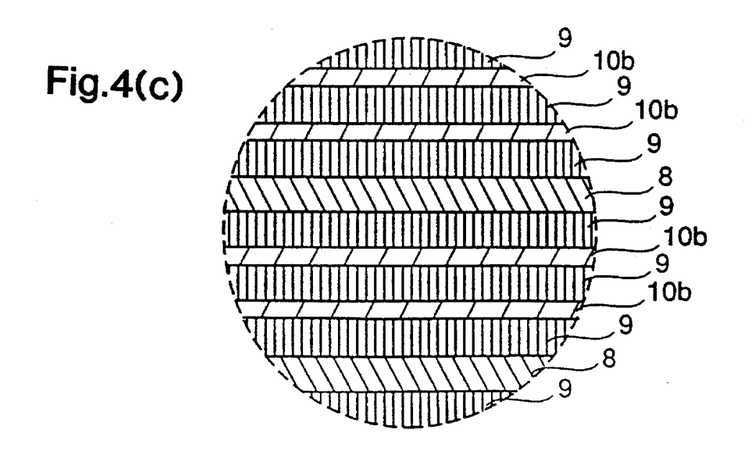

The active region 3a may not be limited to the laminated pattern as shown in FIG. 4(a), but may be a laminated layer pattern laminating two $In_{0.58}Ga_{0.42}As_{0.88}P_{0.12}$ tensile stress quantum well layers 10a having a thickness of 200 Å and a strain quantity of −0.05% and the above described compressive stress quantum well layer 8 alternatingly, each of the layers being located between the above described barrier layers 9, or a laminated layer pattern laminating two $In_{0.52}Ga_{0.48}As_{0.99}P_{0.01}$ tensile stress quantum well layer 10b having a thickness of 100 Å and a strain quantity of −0.1% and the above described compressive stress quantum well layer 8 alternatingly, each of the layers being located between the above described barrier layers 9.

The wavelength of the laser light to be modulated and the material, lattice strain, and layer thickness of the quantum well are in a relation as in the following.

First of all, when the wavelength of the laser light to be modulated is λ, the energy band gap Eg of the quantum well formed at the active region 3a is represented by following formula (1), $$Eg=1.24/\lambda(eV) \qquad (1)$$

When $In_{1-x}Ga_xAs_yP_{1-y}$ is employed for the material of the quantum well in this second embodiment, the energy band gap Eq of the quantum well is represented by the following formula (2), $$Eq=1.35+0.91x-0.99y+0.15xy(eV) \qquad (2)$$

The lattice constant $\alpha_0$ of the InP substrate 5 is 5.8688 Å, and the lattice constant $\alpha_q$ of the quantum well formed on the InP substrate 5 is represented by following formula (3), $$\alpha q=5.8688-0.4176x+0.1896y+0.0125xy(Å) \qquad (3)$$

When the stress due to the lattice strain is σ, the energy band gap shift γEs2 due thereto is represented by $$\gamma Es2=4.9\times10^{-12}(eV/dyn\ cm^{-2})\times\sigma \qquad (4)$$

When the energy band gap shift by the thinning is γEs1 (for example, that of InGaAsP of 200 Å is +30 meV), for a bulk crystal, a crystal having an energy band gap $$Eg-\gamma Es1-\gamma Es2 \qquad (5)$$

is formed on the InP substrate 5 which does not lattice match therewith, a quantum well having an energy band gap Eg is obtained. The lattice constant α which this crystal originally possesses becomes, with making the degree of lattice mismatch ε, $$\sigma=Ah\ \epsilon(A;\ \text{physical constant of crystal},\ h;\ \text{layer thicknesses}) \qquad (6)$$

$$\epsilon=((\alpha-\alpha_0)/\alpha_0)\times100 \qquad (7)$$

The composition of respective quantum wells of the active region 3a of this second embodiment is determined by replacing the energy band gap Eg in the formula (5) and the lattice constant α obtained from the formulae (6) and (7) in the formulae (2) and (3).

Furthermore, layer thicknesses of respective layers of the active region 3a are set below the critical film thickness $h_c$ due to "People and Bean Theory", so that the crystal is not be destroyed. They are determined considering the total sum of the stress applied to the crystal interface of respective layers formed at the active region 3a which is represented by $$\Sigma\sigma = \Sigma A_i h_i \epsilon_i = A_1 h_1 \epsilon_1 + A_2 h_2 \epsilon_2 + A_3 h_3 \epsilon_3 + \ldots + A_n h_n \epsilon_n \quad (8)$$

Here, $A_i$: physical constant of the crystal of the i-th layer, $h_i$: layer thickness of the i-th layer, $s_i$: the degree of lattice mismatch of the i-th layer, n: total layer number.

In this second embodiment, even if the laminated layer pattern of the active region 3a comprising two kinds of quantum wells having a positive or negative lattice strain is a desired laminated pattern having a period, if it is a laminated layer pattern of a period which does not cause fracture of crystal due to lattice strain of the quantum well layer at the crystal growth, it can be utilized as a multi quantum well structure of the active region 3a of the semiconductor optical modulator, and modulation can be performed with an increased light extinction ratio and no polarization plane dependency.

Even when the wavelength of the laser light to be modulated or the material of the substrate and the quantum well are different from those of the second embodiment, the material and layer thickness of respective layers of the active region may be determined employing the formulae (1) to (8).

Embodiment 3

Figure 5:
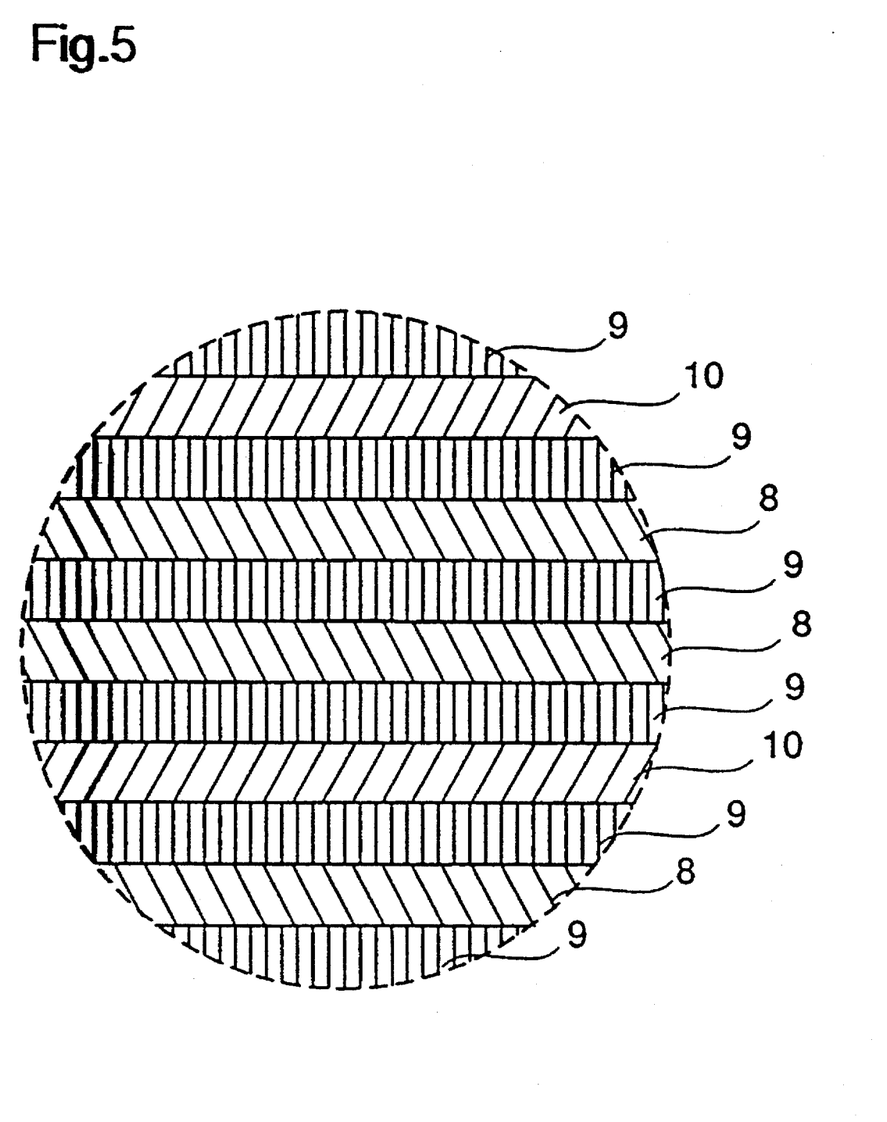
FIG. 5 is a partially enlarged view illustrating a laminated structure of an active region of a semiconductor optical modulator according to a third embodiment of the present invention.

In the semiconductor optical modulator of the third embodiment shown in FIG. 5, the laminating layer structure of the active region 3a has laminated the compressive stress quantum well layer 8 and the tensile stress quantum well layer 10 each of which is located between the barrier layers 9 irregularly. Then, the compressive stress quantum well layer 8 and the tensile stress quantum well layer 10 should have respectively appropriate strain quantities so that there may not fracture of the crystal due to lattice mismatch at the crystal growth. Then, it can be utilized as the multi quantum well structure of the active region, whereby a semiconductor optical modulator having no polarization plane dependency is obtained.

Embodiment 4

Figure 6A:
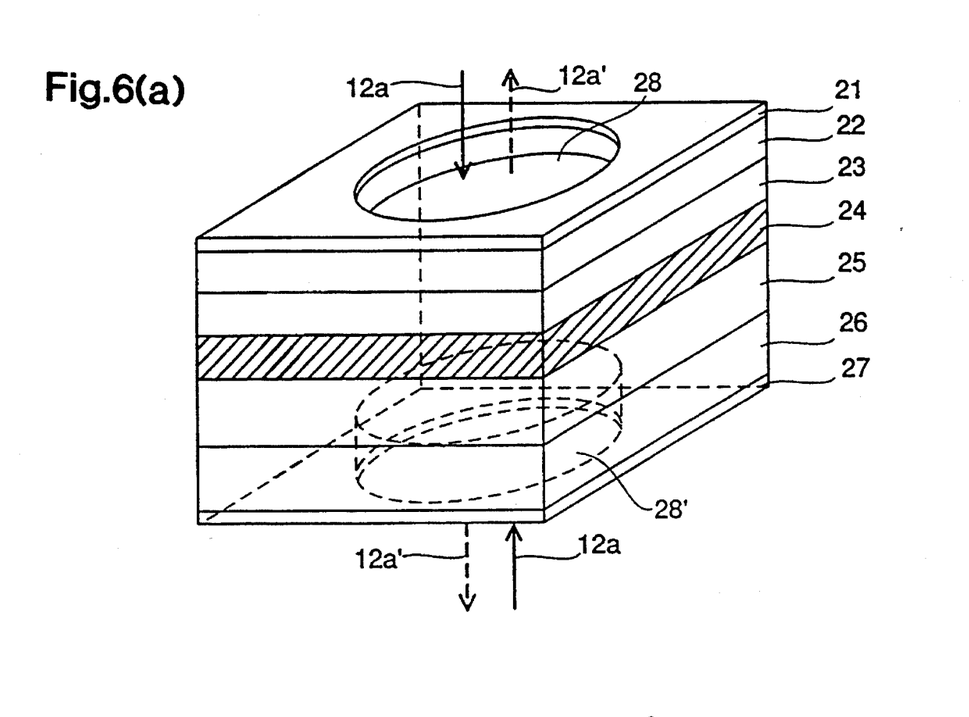
FIG. 6(a) is a perspective view illustrating a semiconductor optical modulator according to a fourth embodiment of the present invention and, FIG. 6(b) is a partially enlarged view illustrating a laminated structure of an active region thereof.
Figure 6B:
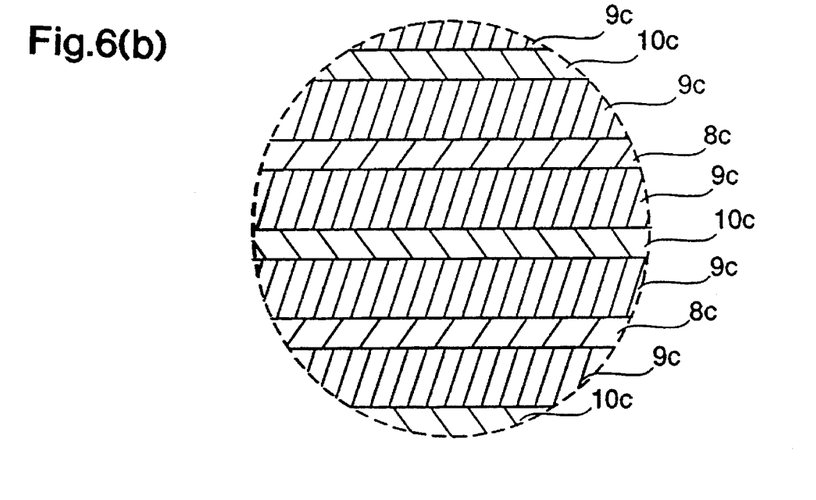

FIGS. 6(a) and 6(b) show a semiconductor optical modulator and a partially enlarged view of the active region thereof according to a fourth embodiment of the present embodiment, respectively. While the semiconductor optical modulators of the first to third embodiments modulate the laser light 12 of a wavelength 1.32 μm, the semiconductor optical modulator of this fourth embodiment is one corresponding to the laser light 12a of a wavelength 0.69 μm that is utilized as a visible light laser.

In FIG. 6(a), reference numeral 26 designates an n type GaAs substrate 500 μm thick. On the n type GaAs substrate 26, an n type AlGaInP cladding layer 25 1.5 μm thick, an active region 24 totally 6 μm thick of a multi quantum well structure, a p type AlGaInP cladding layer 23 1.5 μm thick, and a p type GaAs contact layer 22 2.5 μm thick are successively formed, and a p type electrode 21 (Ti, Pt, Au) is formed on the upper surface of the p type GaAs contact layer 22, and an n type electrode 27 (Au, Ge, Ni, Au) is formed on the lower surface of the n type GaAs substrate 26. Thereafter an aperture 28 is formed at the upper surface of the device by selectively etching portions of the p type electrode 21 and p type GaAs contact layer 22 so as to completely expose the surface of the p type AlGaInP cladding layer 23, and an aperture 28' is formed at the lower surface of the device by etching portions of the n type electrode 27 and the n type GaAs substrate 26 so as to completely expose the surface of the n type AlGaInP cladding layer 25. The p type GaAs contact layer 22 and the n type GaAs substrate 26 are required to be completely removed at the apertures 28 and 28' because these layers absorb the laser light 12a of a wavelength 0.69 μm.

The active region 24 comprises, alternatingly laminated $In_{0.43}Ga_{0.57}As_{0.15}P_{0.85}$ compressive stress quantum well layer 8c (strain quantity is +0.1%) 100 Å thick and $In_{0.39}Ga_{0.61}As_{0.18}P_{0.82}$ tensile stress quantum well layer 10c (strain quantity is −0.1%) 100 Å thick, each these layers being located between the AlGaInP barrier layer 9c 200 Å thick as shown in FIG. 6(b). A laminated layer pattern comprising the barrier layer 9c, the compressive stress quantum well layer 8c, the barrier layer 9c, and the tensile stress quantum well layer 10c forms one period, and 100 periods of the laminated layer pattern are laminated, amounting to a total thickness of 6 μm.

The AlGaInP barrier layer 9c may comprise AlGaAs and the laminated layer pattern of the active region 24 may be a laminated layer pattern as shown in the second and third embodiments.

Also in the semiconductor optical modulator according to the fourth embodiment of the above described structure, when an electric field is applied to the active region 24, the $In_{0.43}Ga_{0.57}As_{0.15}P_{0.85}$ compressive stress quantum well layer 8c absorbs the TM polarized wave and the $In_{0.39}Ga_{0.61}As_{0.18}P_{0.82}$ tensile stress quantum well layer 10c absorbs the TE polarized wave of the laser light 12a of a wavelength 0.69 μm including both of TE and TM modes, whereby a semiconductor optical modulator that can modulate the laser light 12a including both of the TE and TM modes without dependency on the polarization plane and with a high light extinction ratio are obtained.

In this fourth embodiment, the quantum wells satisfying the conditions of the materials and the thicknesses of respective layers of the active region as described with reference to the formulae (1) to (8) in the second embodiment and having a positive and a negative lattice strain corresponding to the wavelength for the light to be modulated are laminated in a predetermined laminated layer pattern to obtain an active region, whereby a semiconductor optical modulator modulating the laser light of various wavelengths without dependency on the polarization plane is obtained.

Embodiment 5

In the above described first to third embodiments, the semiconductor optical modulator modulating the laser light 12 advancing perpendicular to the junction plane of the active region 3a is described as shown in FIG. 1(a). In this fifth embodiment, a semiconductor optical modulator modulating the laser light 12 advancing parallel to the junction plane of the active region 3a is provided.

Figure 7:
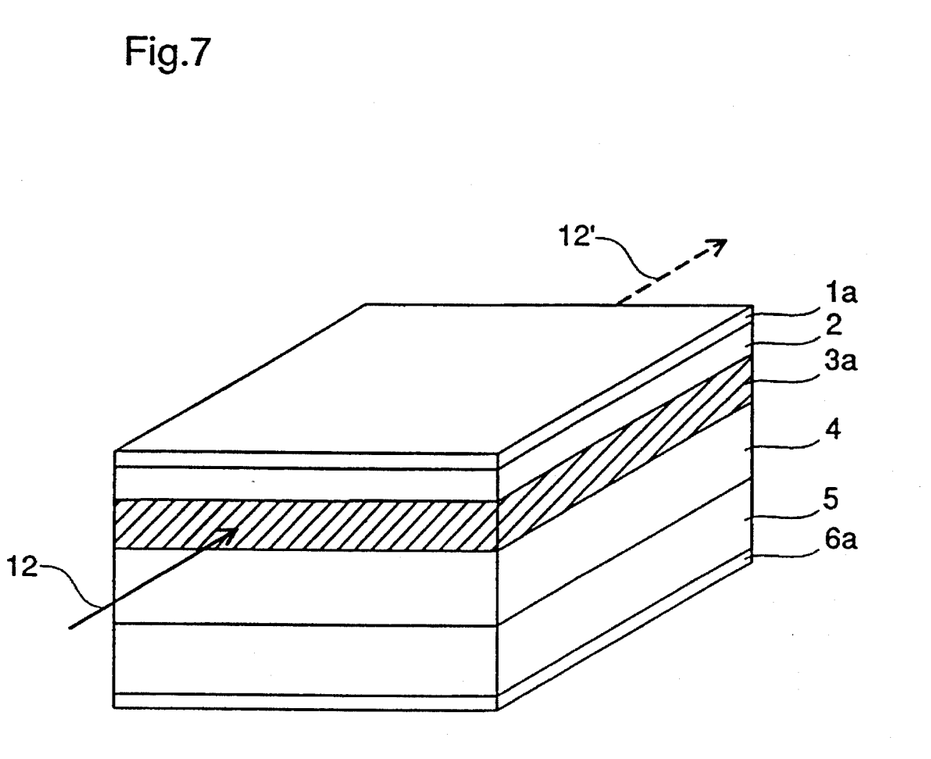
FIG. 7 is a perspective view illustrating a semiconductor optical modulator according to a fifth embodiment of the present invention.

As shown in FIG. 7, this semiconductor optical modulator has respective semiconductor layers that are the same as those in the first to third embodiments, and the p type electrode 1a and the n type electrode 6a do not have apertures for incidence and output of light. This modulator modulates the laser light 12 incident on the side surface of the active region 3a to output the modulated light 12' from the surface at the opposite side thereof.

As described in the first embodiment with reference to FIG. 2, in the structure modulating the laser light 12 advancing parallel to the junction plane of the active region 3a, the quantum well having a negative strain absorbs the light of the TM mode and the quantum well having a positive strain absorbs the light of the TE mode when an electric field is applied for laser light 12 including both of the TE and TM modes and incident on the active region 3a.

Also in the semiconductor optical modulator of this fifth embodiment, the laser light 12 including both of the TE and TM modes can be modulated without dependency on the polarization plane and with a high light extinction ratio.

While this fifth embodiment is applied to the semiconductor optical modulator of the structure employed in the first to third embodiments, the structure of this fifth embodiment may be applied to a semiconductor optical modulator of the fourth embodiment corresponding to a laser light 12a of wavelength 0.69 μm.

Embodiment 6

Figure 8A:
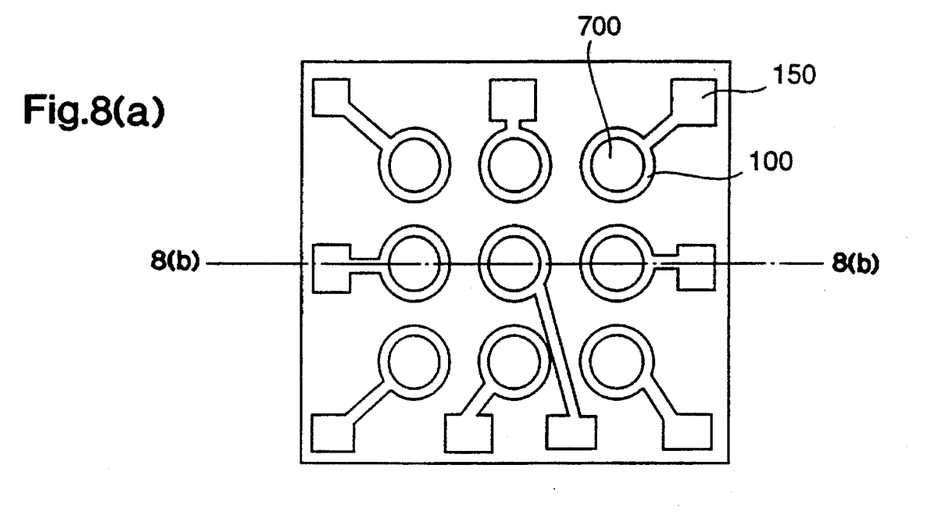
FIGS. 8(a)–8(c) are a plan view, a cross sectional view, and a rear view respectively illustrating a semiconductor optical modulator according to a sixth embodiment of the present invention.
Figure 8B:
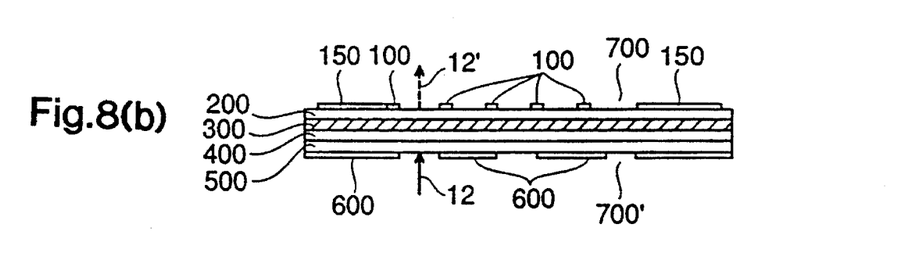
Figure 8C:
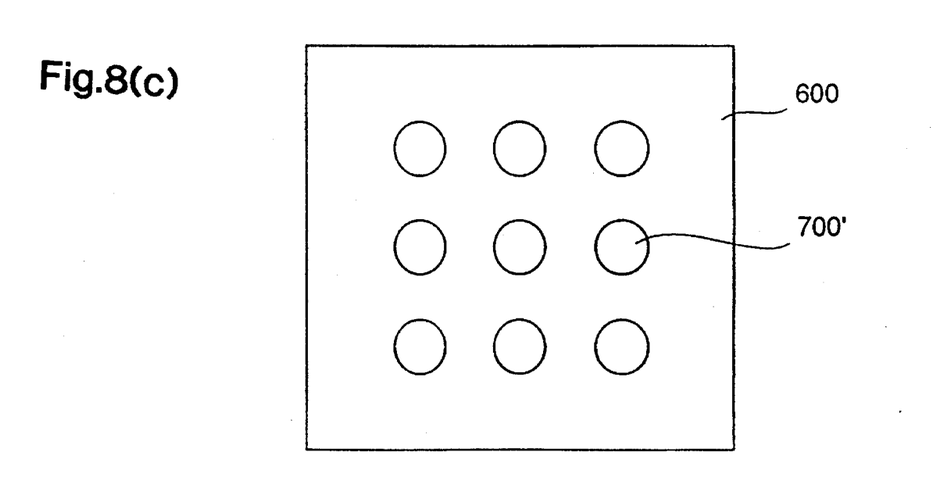

The semiconductor optical modulator of this sixth embodiment includes the semiconductor optical modulators of the first embodiment in an array for modulating a plurality of laser light beam respectively, which are output from the array laser. FIG. 8(*a*) shows a semiconductor optical modulator of this sixth embodiment, FIG. 8(*b*) shows a cross section taken along line 8b–8b in FIG. 8(*a*), and FIG. 8(*c*) shows a rear view thereof.

In FIGS. 8(*a*)–8(*c*), the layer structure of this semiconductor optical modulator has a laminated layer structure similar to that in the semiconductor optical modulator of the first embodiment including the active region 300. In other words, on an n type InP substrate 500, an n type InP cladding layer 400 1.5 μm thick, an active region 300 having a total thickness of about 8 μm comprising multi quantum well structure including positive and negative lattice strains as shown in FIG. 1(*b*), and a p type InP cladding layer 200 1.5 μm thick are successively formed. On the upper surface of the p type InP cladding layer 200, nine p side electrodes 100 (Au, Zn) respectively having a circular aperture 700 of a depth reaching the p type InP cladding layer 200 and bonding pads 150 for performing wire bonding are provided, and at the lower surface of the n type InP substrate 500, an n side electrode 600 (Au, Cr) having nine apertures 700' of a depth reaching the n type InP substrate 500 confronting to the aperture 700 is provided.

In addition, the diameters of the apertures 700 and 700' is determined in accordance with the beam diameter of the laser light 12, and the diameter is here 10 μm. The distance between the outer periphery of the adjacent electrodes in respective electrodes 100 and 600 is required to be longer than the diffusion length of carriers so as not to generate crosstalk. That distance is 5 μm thick in the sixth embodiment employing InP.

A description is given of the operation.

In this semiconductor optical modulator formed in an array, as in the first embodiment, the modulation operations are the same when the laser light 12 advances from the upper surface to the lower surface or when the laser light 12 advances from the lower surface to the upper surface. So, only a description is given of the operation when the laser light 12 advances from the lower surface to the upper surface will be described.

Nine beams of the CW laser light 12 having a wavelength of 1.32 μm respectively irradiating to the nine apertures 700' at the n side electrode 600 which are output from the array laser as a light source reach the active region 300 be being transmitted through the n type InP substrate 500 and the n type InP cladding layer 400.

Then, the nine laser light beam 12 include variations in polarization plane modes due to variations in the compositions and film thicknesses at the respective nine output portions of the array laser, because these output portions are difficult to produce in the same manner.

The active region 300 has the same material, layer thickness, and laminating layer pattern as those of the active region 3a of the first embodiment shown in FIG. 1(*b*), and therefore the active region modulates the respective nine laser light beams 12 independently by absorbing or transmitting the respective laser light beams as described in the first embodiment in accordance with the on/off state of the reverse bias voltage depending on the respective modulation signals applied between the nine p side electrodes 100 and n side electrode 600 without depending on the polarization plane.

More particularly, the laser light 12 which is incident from the aperture 700' at the n side electrode 600 confronting the aperture 700 at the p side electrode 100 is cut in its advance when a reverse bias voltage is applied between the p side electrodes 100 and the n side electrode 600. Both the TE and TM modes confined by the multi quantum well of the active region 300 serving as an absorption layer have no polarization plane dependency when an electric field is applied as shown in FIG. 1(*b*), even when the light includes variations in the polarization plane modes. On the other hand, when no reverse bias voltage is applied, the laser light 12 is transmitted through the active region 300, and passes through the p type InP cladding layer 200 to be emitted from the aperture 700 of the p side electrodes 100. Then, nine p side electrodes 100 are provided and separate modulation signals are applied to respective electrodes, the nine laser light beams 12 incident to the nine apertures 700' provided at the n side electrode 600 are respectively modulated without polarization plane dependency to produce nine modulated light beams 12', and these are output from the apertures 700 of the p side electrode 100, respectively, confronting the apertures 700' at the n side electrode 600.

According to the sixth embodiment including the semiconductor optical modulators of the first embodiment in an array, the nine laser light beams 12 including both the TE and TM modes can be modulated without dependency on respective polarization planes and regardless of variations in the two modes. Further, it can be applied as an optical mask of a matrix shape in an optical synapse network employed in an optical neurochip.

The light source in the semiconductor optical modulator of this sixth embodiment is not limited to an array laser emitting a plurality of laser light beams but may be one that is obtained by optically enlarging the beam size of a laser light that is output from a laser source. The active region 300 of this sixth embodiment may be that of a multi quantum well structure of the same laminated layer pattern as in the second and third embodiments. Or it may be a structure including a laminated layer structure in accordance with the wavelength of the laser light to be modulated as shown in the fourth embodiment.

As is evident from the foregoing description, according to the present invention, a semiconductor optical modulator emitting laser light incident on the active region and modulating the same by absorbing or transmitting the same in accordance with an electric field applied, includes an active region having a first semiconductor layer comprising a material having a larger lattice constant than that of the semiconductor substrate and a second semiconductor layer comprising a material having a smaller lattice constant than that of the semiconductor substrate formed on the semiconductor substrate. Accordingly, when the optical modulator absorbs the light incident on the active region, the first semiconductor layer absorbs one of the polarization modes and the second semiconductor layer absorbs the other of the two polarization modes among the two polarization modes of the laser light, whereby a semiconductor optical modulator that absorbs laser light having two polarization wave modes to a high degree without polarization plane dependency is obtained.

According to the present invention, the active region is a multi quantum well structure having a first quantum well layer having a positive lattice strain, a second quantum well layer having a negative lattice strain, and a barrier layer, and cladding layers having energy band gaps larger than those of the first quantum well layer, the second quantum well layer, and the barrier layer are provided above and below the active region. Accordingly, when an electric field is applied to the semiconductor optical modulator, the first quantum well layer absorbs one of the two polarization modes while the second quantum well layer absorbs the light of the other of the two polarization modes of the laser light incident on the active region, and when no electric field is applied, the laser light is transmitted and emitted without a lowering of the intensity of the laser light that is incident. Thereby, it is not only possible to absorb the laser light having two polarization modes to a high amount but also to increase the number of quantum wells without causing fracture of, crystal by canceling the positive strain of the first quantum well layer and the negative strain of the second quantum well layer with each other thereby suppressing the total strain quantity of the active region, whereby a semiconductor optical modulator having no polarization plane dependency, a high light extinction ratio, and a high efficiency is obtained.

According to the present invention, on the upper and the lower surface of the semiconductor optical modulator electrodes having apertures confronting each other with of predetermined configurations are provided, and the laser light incident from the apertures at the upper surface or the lower surface is modulated to be output from the apertures at the lower surface or the upper surface confronting the other. Therefore, when a reverse bias voltage is applied between electrodes of the upper surface and the lower surface, the first quantum well layer absorbs the TM polarized wave while the second quantum well layer absorbs the TE polarized wave in the active region of the laser light including both of the TE and TM modes and incident on the apertures at the upper surface or the lower surface, whereby absorption of the laser light of both of TE and TM modes can be performed and the modulated light that is modulated without polarization plane dependency can be output from the apertures of the upper surface or the lower surface.

According to the present invention, a plurality of electrodes each having an aperture at the upper surface of the semiconductor optical modulator and an electrode having the same number of apertures confronting the apertures at the upper surface is provided at the lower surface, and a plurality of laser light beams incident from the plurality of apertures at the upper surface or the lower surface are respectively modulated and output from the apertures of the confronting lower surface or upper surface. Therefore, a semiconductor optical modulator having no polarization plane dependency and formed in an array that absorbs the plurality of laser light beams including both of the TE and TM modes which are incident from the plurality of apertures provided at the upper surface or the lower surface can be obtained. This can be applied to a matrix shaped optical mask in an optical synapse network employed in an optical neurochip.

What is claimed is:

1. A semiconductor optical modulator comprising:

a semiconductor substrate having a lattice constant;

an active region including a laminated multi quantum well structure comprising first quantum well layers having a band gap energy and a positive lattice strain relative to said semiconductor substrate, second quantum well layers having a band gap energy and a negative lattice strain relative to said semiconductor substrate, and barrier layers having a band gap energy, a barrier layer being dispose between pairs of said first and second quantum well layers; and upper and lower cladding layers having band gap energies at least as large as those of said first quantum well layers, said second quantum well layers, and said barrier layers, said upper and lower cladding layers being disposed on opposite sides of said active region, respectively, said lower cladding layer being disposed between said semiconductor substrate and said active region.

2. The semiconductor optical modulator of claim 1 wherein said first quantum well layers and second quantum well layers have strains of equal absolute values.

3. The semiconductor optical modulator of claim 2 wherein said semiconductor substrate comprises InP, said modulator modulates laser light having a wavelength of 1.32 µm, each of said first quantum well layers comprises $In_{0.57}Ga_{0.43}As_{0.89}P_{0.11}$ having a strain of +0.1%, each of said second quantum well layers comprises $In_{0.39}Ga_{0.61}As_{0.18}P_{0.82}$ having a strain of −0.1%, and each of said barrier layers comprises $In_{0.757}Ga_{0.23}As_{0.51}P_{0.49}$.

4. The semiconductor optical modulator of claim 2 wherein said semiconductor substrate comprises GaAs, said modulator modulates laser light having a wavelength of 0.69 µm, each of said first quantum well layers comprises $In_{0.43}Ga_{0.15}As_{0.15}P_{0.85}$, having a strain of +0.1%, each of said second quantum well layers comprises $In_{0.39}Ga_{0.61}As_{0.18}P_{0.82}$ having a strain of −0.1%, and each of said barrier layers comprises one of AlGaInP and AlGaAs.

5. The semiconductor optical modulator of claim 1 wherein said first quantum well layers and said second quantum well layers are laminated in a pattern the pattern being periodically repeated.

6. The semiconductor optical modulator of claim 5 wherein said semiconductor substrate comprises InP, said modulator modulates laser light having a wavelength of 1.32 µm, said active region comprises, alternatingly laminated, two first quantum well layers comprising $In_{0.57}Ga_{0.43}As_{0.89}P_{0.11}$ having a strain of +0.1%, two second quantum well layers comprising $In_{0.39}Ga_{0.61}As_{0.18}P_{0.82}$ having a strain of −0.1%, and each of said barrier layers comprises $In_{0.77}Ga_{0.23}As_{0.51}P_{0.49}$.

7. The semiconductor optical modulator of claim 5 wherein said semiconductor substrate comprises InP, said modulator modulates laser light having a wavelength of 1.32 µm, said active region comprises, alternatingly laminated, a first quantum well layer comprising $In_{0.57}Ga_{0.43}As_{0.89}P_{0.11}$ having a strain of +0.1%, two second quantum well layers each comprising $In_{0.58}Ga_{0.42}As_{0.88}P_{0.12}$ having a strain of −0.1%, and each of said barrier lawyers comprises $In_{0.77}Ga_{0.23}As_{0.51}P_{0.49}$.

8. The semiconductor optical modulator of claim 5 wherein said semiconductor substrate comprises InP, said modulator modulates laser light having a wavelength of 1.32 μm, said active region comprises a first quantum well layer comprising $In_{0.57}Ga_{0.43}As_{0.89}P_{0.11}$ having a strain of +0.1%, two second quantum well layers each comprising $In_{0.52}Ga_{0.48}As_{0.99}P_{0.1}$ having a strain of −0.1%, and each of said barrier layers comprises $In_{0.77}Ga_{0.23}As_{0.51}P_{0.49}$.

9. The semiconductor optical modulator of claim 1 herein said active region comprises said first quantum well layers and said second quantum well layers laminated irregularly, so that the sum of stresses of respective layers of said active region is within a range.

10. The semiconductor optical modulator of claim 9 wherein said semiconductor substrate comprises InP, said modulator modulates laser light having a wavelength of 1.32 μm, said first quantum well layer comprises $In_{0.57}Ga_{0.43}As_{0.89}P_{0.11}$ having a strain of +0.1%, said second quantum well layer comprises $In_{0.39}Ga_{0.61}As_{0.18}P_{0.82}$ having a strain of −0.1%, and each of said barrier layers comprises $In_{0.77}Ga_{0.23}As_{0.51}P_{0.49}$.

11. The semiconductor optical modulator of claim 1, wherein said semiconductor optical modulator includes electrodes having apertures of predetermined configuration opposite each other on upper and lower surfaces of said modulator, respectively, laser light incident on the apertures at one of said upper surface and said lower surface being modulated and emitted from the apertures at the other of said lower surface and said upper surface.

12. The semiconductor optical modulator of claim 1, wherein said semiconductor optical modulator includes electrodes having apertures of predetermined configuration at upper and lower surfaces of said modulator, respectively, the apertures at said upper surface and said lower surface confronting each other, a plurality of laser light beams respectively incident on the apertures at one of said upper surface and said lower surface being emitted from the plurality of apertures of the other of said lower surface on and said upper surface.

13. The semiconductor optical modulator of claim 1 wherein said semiconductor optical modulator includes a plurality of electrodes, each electrode having an aperture at an upper surface of said modulator and an electrode having the same number of apertures as on said upper surface disposed on a lower surface of said modulator, opposite to said upper surface, a plurality of laser light beams incident at the apertures at one of said upper surface and said lower surface being modulated and emitted from the plurality of apertures at the other of said lower surface and said upper surface.

* * * * *

UNITED STATES PATENT AND TRADEMARK OFFICE
CERTIFICATE OF CORRECTION

PATENT NO. : 5,621,564
DATED : April 15, 1997
INVENTOR(S) : Kageyama et al.

It is certified that error appears in the above-identified patent and that said Letters Patent is hereby corrected as shown below:

Column 14, Line 42, change "$In_{0757}Ga_{0.23}As_{0.51}P_{0.49}$"

to --$In_{0.77}Ga_{0.23}As_{0.51}P_{0.49}$--;

Line 47, change "$In_{0.43}Ga_{0.15}As_{0.15}P_{0.85}$"

to --$In_{0.43}Ga_{0.57}As_{0.15}P_{0.85}$--;

Line 53, after "pattern" insert --,--;

Column 15, Line 4, change "lawyers" to --layers--;

Line 27, after "claim 1" delete --,--;

Column 16, Line 6, after "claim 1" delete --,--;

Line 14, after "surface" delete --on--.

Signed and Sealed this

Second Day of December, 1997

Attest:

BRUCE LEHMAN

*Attesting Officer*     *Commissioner of Patents and Trademarks*